United States Patent [19]

Lee

[11] Patent Number: 4,877,000

[45] Date of Patent: Oct. 31, 1989

[54] INTERNAL COMBUSTION ENGINE

[76] Inventor: Thomas Y. Lee, P.O. Box 8801, Tamuning, Guam 96911

[21] Appl. No.: 198,361

[22] Filed: May 25, 1988

[51] Int. Cl.$^4$ .......................... F22B 17/10; F22B 9/06
[52] U.S. Cl. .................................. 123/292; 123/78 D
[58] Field of Search ...................... 123/292, 78 D, 293, 123/289, 69 R, 70 R

[56] References Cited

U.S. PATENT DOCUMENTS

| | | | | |
|---|---|---|---|---|
| 3,446,192 | 5/1969 | Woodward | ........................ | 123/78 D |
| 4,351,294 | 9/1982 | Giddings | ............................ | 123/292 |
| 4,359,025 | 11/1982 | Zeliszkewycz | ...................... | 123/292 |
| 4,406,260 | 9/1983 | Burley | ................................. | 123/292 |
| 4,665,868 | 5/1987 | Adams | ................................. | 123/292 |
| 4,744,341 | 5/1988 | Hareyama et al. | ................. | 123/292 |

Primary Examiner—Raymond A. Nelli
Attorney, Agent, or Firm—Armstrong, Nikaido, Marmelstein Kubovcik & Murray

[57] ABSTRACT

An internal combustion engine which includes a cylinder, a piston mounted for movement internally of the cylinder, a precombustion chamber and a device external of the cylinder for compressing and transferring air to the precombustion chamber. The cylinder is provided as a bore extending through a member mounted on trunnions for rocking or pivoting movement internally of the engine and the pivoting member provides the device for compressing air which is transferred to the precombustion chamber.

9 Claims, 5 Drawing Sheets

INTERNAL COMBUSTION ENGINE

BACKGROUND OF THE INVENTION

The present invention is directed to an internal combustion engine and more specifically, to a two cycle, internal combustion engine wherein compression of incoming air and combustion of an air fuel mixture are independently performed by separate components of the engine.

The engine of the present invention also permits a change or adjustment of the compression ratio delivered by the engine and is therefore useful not only with gasoline but with other fuels as well and may be used in automotive, aircraft, marine and such stationary applications where conventional internal combustion engines are presently used.

In conventional internal combustion engines compression ratio is a function of piston displacement internally of the cylinder bore. The amount of air available for admixture to the fuel and the extent to which it may be compressed are therefore limited by the volumetric displacement of the piston on a compression stroke. Since the compression stroke follows a power stroke the force available for compressing incoming air is correspondingly diminished which is a negative effect inherent in conventional internal combustion engine designs particularly in small engines utilizing only one or two pistons. Although such negative effects may be overcome by increasing the volumetric displacement of the piston or enhancing the air fuel mixture, such accommodations adversely effect fuel efficiency.

The present invention avoids the foregoing problems and offers other advantages as well by separating and providing independent devices for performing the air compression and the air-fuel mixture combustion functions of the engine. In the present invention the combustion function is performed by means of a piston reciprocally slidably mounted in a cylinder bore while the compression function is performed by a member external of the cylinder bore which is pivotally mounted on trunnions internally of the engine. The piston is slidably received internally of a cylinder bore extending through the member mounted for pivoting or rocking movement internally of the engine. As the piston slides internally of the bore the piston not only drives a crankshaft but also causes the trunnion mounted member to pivot about the trunnions drawing air into and compressing air in compression chambers provided on opposite sides of the member. The compression chambers and air flow passages are provided independently of design considerations for the piston and cylinder bore and therefore may draw in and compress a greater quantity of air than would be possible with the volumetric piston displacement for a given engine and thus provide a larger compression ratio than possible with conventional engine designs.

In the preferred embodiment the present invention also includes a fluid passageway leading from each of the compression chambers to a precombustion chamber, a fluid conduit leading from one of the fluid passageways to an exhaust passage and a pressure regulator permitting flow through the fluid conduit to release excess pressure from the fluid passageways and thereby maintain a desired compression ratio. The pressure regulator may be preset for a particular type of fuel or fuel mixture and desired compression ratio, or it may be adjustable or replaced with another pressure regulator to accommodate either a different type of fuel, a different air fuel mixture or a different compression ratio depending upon the application for which the engine is intended to function.

The present invention thus provides an internal combustion engine wherein means other than the piston and cylinder bore are utilized to compress air required for a fuel mixture, thereby permitting the potential of a larger compression ratio than conventional engine designs which are limited by volumetric piston displacement considerations as well as the ability to adjust or change the compression ratio to accommodate different types of fuel, different air fuel mixtures, or to change the compression ratio for a particular application.

SUMMARY OF THE INVENTION

The present invention provides an internal combustion engine which includes a cylinder, a piston mounted for reciprocating movement internally of the cylinder, a precombustion chamber associated with the cylinder and adapted to receive a mixture of fuel and compressed air, an igniter adapted to fire the mixture, and a device external of the cylinder for compressing and transferring air to the precombustion chamber.

Preferably the cylinder is a bore extending through a member mounted on trunnions for rocking or pivoting movement internally of the engine and the pivoting member provides the device for compressing and transferring air to the precombustion chamber.

The internal combustion engine further includes an engine housing, a cylinder head having a curved inner surface and a crankshaft mounted to the engine block. The pivoting member is formed at one end with a curved surface complementary to the curved inner surface of the cylinder head, the trunnions are located adjacent the other end of the pivoting member, the piston is slidably mounted for reciprocating movement internally of the bore and attached to a crank of the crankshaft. Movement of the piston in the bore rotates the crankshaft and rocks the member about the trunnions.

In the preferred embodiment, the curved inner surface of the cylinder head is a cylindrically curved surface and the cylinder head is formed with a pair of surfaces extending inward from each end of the curved cylindrical surface toward the trunnion mounts and together with the member and the cylindrically curved surface define a compression chamber on each side of the member.

In the preferred embodiment of the internal combustion engine, the cylinder head includes the precombustion chamber which is located proximate a midpoint between the ends of the cylindrical curves surface, first and second fluid passages, each of which is open at one end to one of the compression chambers and at the other end to the precombustion chamber, a valve controlling the flow of fluid from the fluid passages to the precombustion chamber and an exhaust passage located intermediate the one end of the second-fluid passage and the precombustion chamber. An air inlet port is provided in each of the surfaces extending inward from the cylindrical curved surface together with a valve for each air inlet port. Movement of the piston pivots the member toward the first fluid passage drawing air into the compression chamber associated with the second fluid passage and scavenging unburned gases near the exhaust passage, then pivots the member toward the second fluid passage compressing such air as may remain in the compression chamber associated with the second fluid passage while drawing air into the compression chamber associated with the first fluid passage, and then pivots said member back toward the first fluid passage thereby compressing air in the compression chamber associated with the first fluid passage until the cylinder bore is aligned for firing the mixture in the precombustion chamber.

The internal combustion engine also preferably includes a fluid conduit connecting the second fluid passage with the exhaust passage and a pressure regulator controlling fluid flow through the fluid conduit which operates to release excess air pressure through the exhaust passage and thereby maintain a desired compression ratio.

The present invention and advantages provided thereby will be more fully understood with reference to the following Detailed Description of the Preferred embodiment taken in conjunction with the accompanying drawings.

DESCRIPTION OF THE PREFERRED EMBODIMENT

Figure 2:
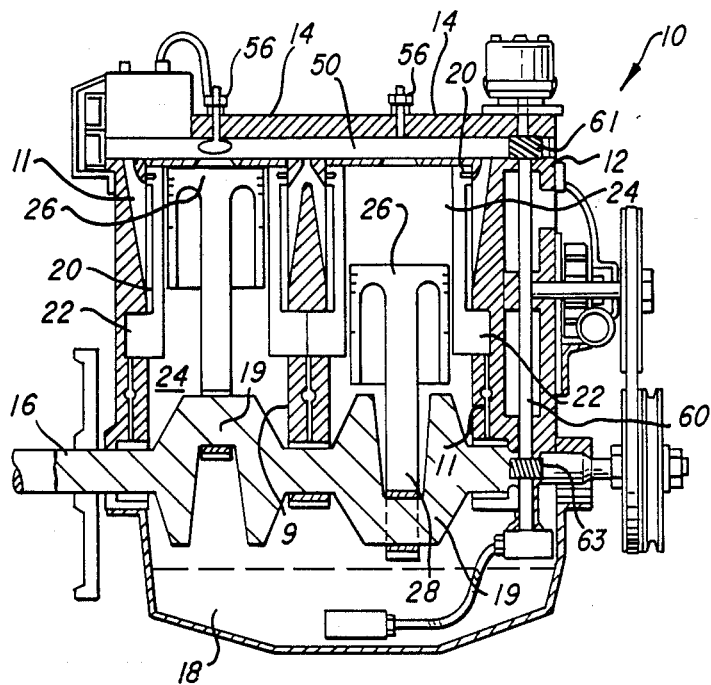
FIG. 2 is a longitudinal sectional view of the internal combustion engine.
Figure 3:
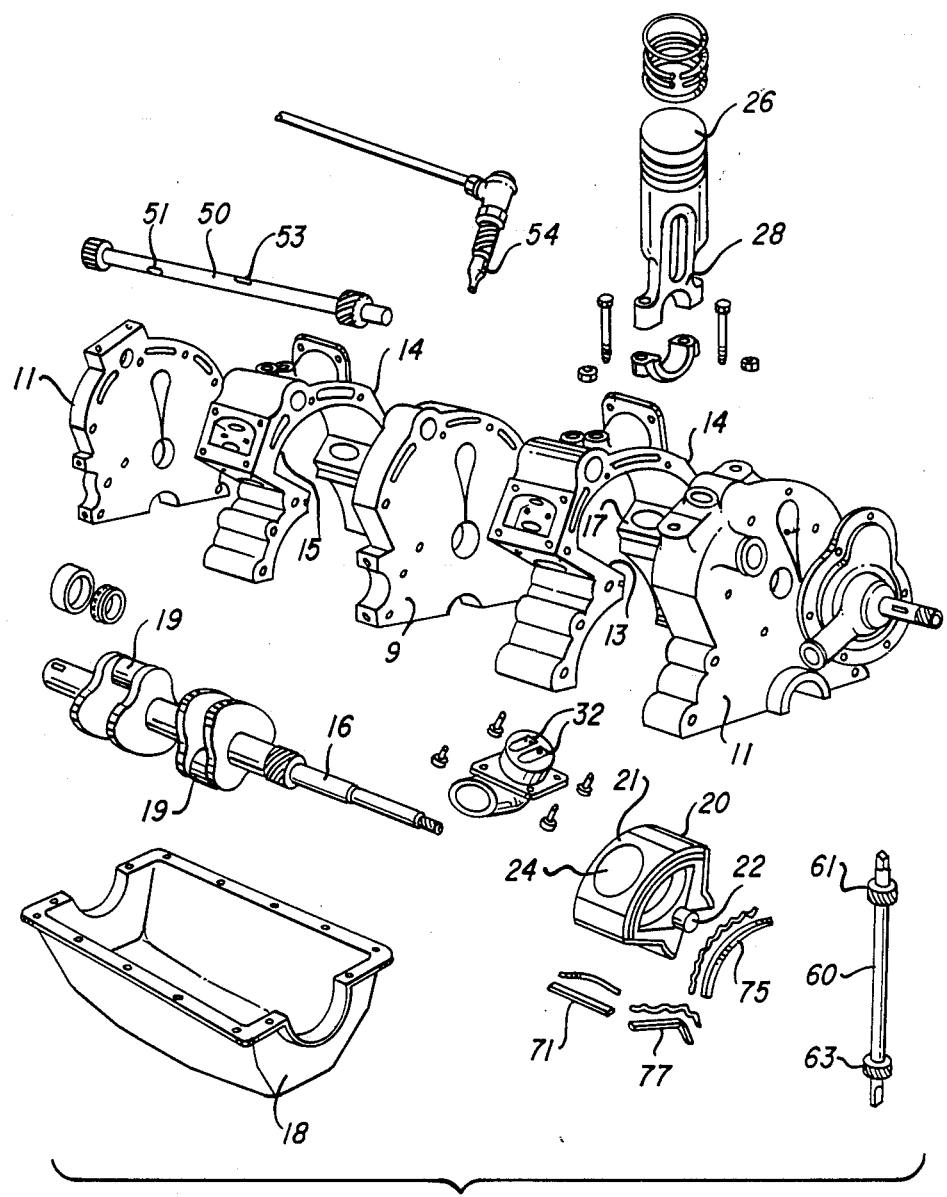
FIG. 3 is an exploded view showing components of the internal combustion engine.

With reference to the drawings wherein like reference numerals designate the same or like parts throughout, there is shown an internal combustion engine 10 comprised of an engine housing 12 including a cylinder head 14, crankshaft 16 and oil pan 18. The crankshaft 16 is rotatably mounted internally of the engine housing and a rocking cylinder or pivoting member 20 is also mounted for pivotal movement internally of the engine housing by means of trunnions 22. The engine 10 is a two cylinder engine, so two pivoting members 20 are shown in FIG. 2 pivotally mounted by means of the trunnions 22 internally of the two cylinder heads 14 as shown by FIGS. 2 and 3. Each of the pivoting members 20 is provided with a cylinder or bore 24 reciprocally, slidably mounting a piston 26 connected by means of a conventional piston rod 28 connection to a crank 19 of the crankshaft 16.

The term engine housing is used to describe what would conventionally be referred to as an engine block since the pistons 26 are reciprocally slidably mounted internally of the bores 24 provided to the pivoting members 20 rather than in bores provided to a conventional engine block.

The interior surface 15 of the cylinder head 14 which forms a part of the engine housing is cylindrically curved. A surface 21 of the pivoting member 20 is also cylindrically curved with a curvature concentric with the access of rotation of the trunnions 22 and substantially matching the curvature of the internal cylindrical surface 15 of the cylinder head 14. The cylinder heads 14 are also formed wi&h a pair of surfaces 13 and 17 which extend inward from respective ends of the cylindrically curved internal surface 15 toward the trunnions mounting the pivoting member 20. The surfaces 13 and 17 are each provided with an air inlet port 31 and 33 respectively which in turn are respectively closed in certain conditions of operation by reed valves 32 and 34.

A pair of outlet ports 35 and 37 are respectively provided adjacent each end of the cylindrically curved internal surface 15 of the cylinder heads 14. The outlet ports 35 and 37 are respectively closed by means of spring biased valve elements 36 and 38 so as to open under influence of pressure from the internal side of the cylindrically curved surface 15 of the cylinder head 14.

A precombustion chamber 40 and an exhaust passage 48 are also provided through the cylindrically curved internal surface 15 of the cylinder head 14. First and second fluid passages 42 and 44 are also cast internally of the cylinder head 14. The outlet ports 35 and 37 provided adjacent the opposite ends of the curved internal surface 15 of the cylinder head provide an opening in fluid communication with one end of the fluid passages 42 and 44 when the valve elements 36 and 38 are displaced from the outlet ports 35 and 37. The other ends of the fluid passages 42 and 44 are selectively placed in fluid communication with the precombustion chamber 40 by operation of a rotary valve 50 having ports 51 and 53. A fuel injection nozzle 54 and an electronic spark plug are also provided through each cylinder head 14 with the end of the nozzle and the spark plug gap located closely adjacent one another in the precombustion chamber 40.

Each cylinder head 14 is also cast with a fluid passage 57 in fluid communication through a boss 59 with the fluid passages 42 and 44. The bosses 59 each mount a pressure regulator 58 which may be preset or adjustable to permit excess pressure to escape from the passages 42 and 44 to the exhaust passage 48.

Figure 1:
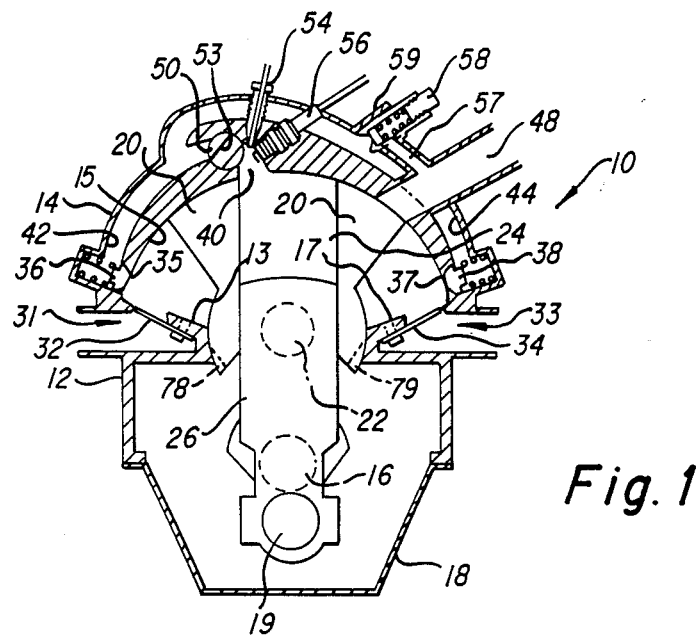
FIG. 1 is a vertical sectional view of the internal combustion engine of the present invention.
Figure 5:
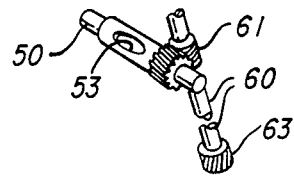
FIG. 5 is a perspective view showing the cooperative relationship between two of the components shown by FIG. 3.

The rotary valve 50 is synchronously driven by means of a rod 60 driven by a gear 63 engaging the crankshaft 16 and driving the rotary valve 50 by means of a timing gear 61 as shown by FIGS. 2 and 5.

Figure 4:
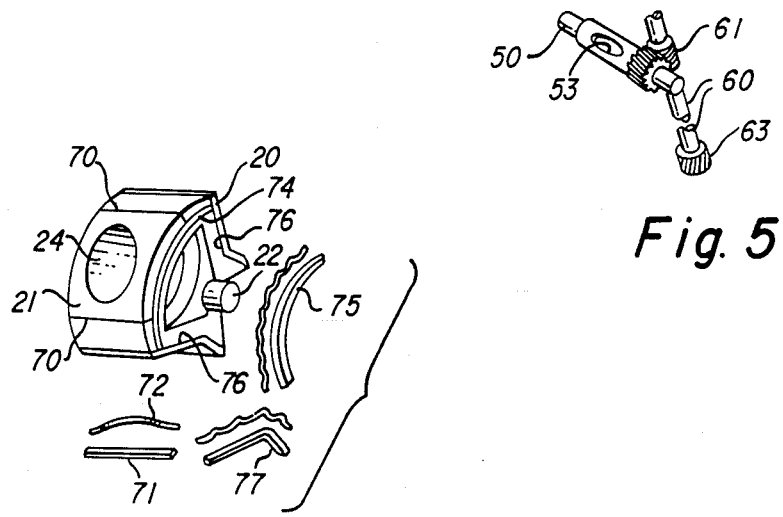
FIG. 4 is an enlarged perspective view of one of the major components of the internal combustion engine and related seals.

As will be explained more fully here below, the curved exterior surface 21 of the pivoting member 20 moves relative to thc cylindrically curved interior surface 15 of the cylinder head 14. As shown by FIG. 4 of the drawings, a pair of grooves are provided in the surface 21 on opposite sides of the cylinder bore 24. A seal 71 biased outwardly by a leaf spring 72 is provided in each groove 70 to effect a moving or sliding seal between the curved surface 21 of the pivoting member 20 and the cylindrically curved interior surface 15 of the cylinder head 14. An arcuate groove 74 and two radially extending, angularly disposed grooves 76 are provided in each side face of the pivoting member 20 for receipt of correspondingly shaped spring biased seals 75 and 77 to effect a moving or sliding seal against the oppositely disposed interior surfaces of the cast water jackets 11 provided at each end of the engine housing 12 and a cast jacket 9 provided intermediate the two cylinder heads 14.

Grooves 78 and 79 are also provided on each side of the pivoting member 20 to permit passage of gas and heat generated in the crankcase to the chambers defined adjacent each side of the pivoting member 20.

Figure 7:
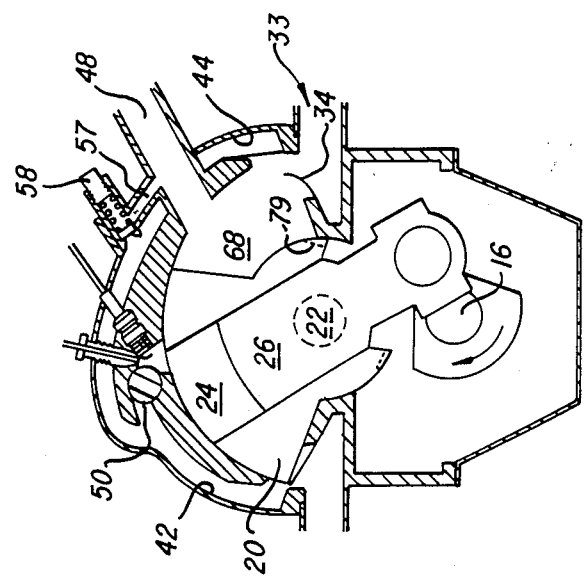
FIGS. 6-9 are vertical sectional views similar to FIG. 1 and showing components of the engine in different stages of operation during one revolution of the crankshaft.
Figure 6:
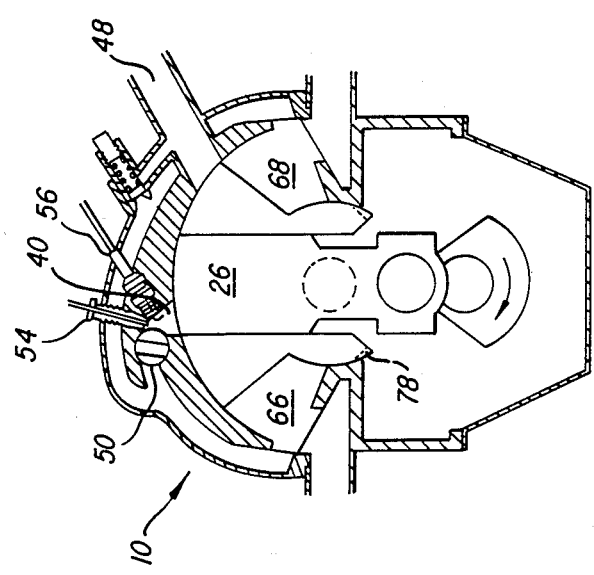

The operation of the internal combustion engine of the present invention will now be described with reference to the operation of the previously described component parts as shown by FIGS. 6-9 of the drawings. In FIG. 6 the piston 26 is at top dead center with the rotary valve 50 closed after having supplied compressed air to the combustion chamber and upon injection of fuel from the fuel injection nozzle 54 the electronic spark plug 56 fires, igniting the mixture of compressed air and fuel. The rapidly expanding gases in the cylinder bore 24 displace the piston 26 downward in the bore 24 causing the crankshaft 16 to rotate in a clockwise direction and the rocking cylinder or pivoting member 20 to pivot in a counter clockwise direction on the trunnions 22 as shown by FIG. 7. This opens the reed valve 34 and draws air through the inlet port 33 into a secondary combustion chamber 68 defined between the cylindrically curved interior surface 15 and the surface 17 of the cylinder head 14. At this stage the secondary compression chamber 68 is open to the exhaust passage 48 and both fill with fresh air which induces further combustion of unburned gases for emission control purposes. In the stage shown in FIG. 7, the piston 26 has been displaced approximately ½ of the total piston stroke with the piston moving the pivoting member 20 30° off the vertical axis of alignment as shown by FIG. 6.

Figure 8:
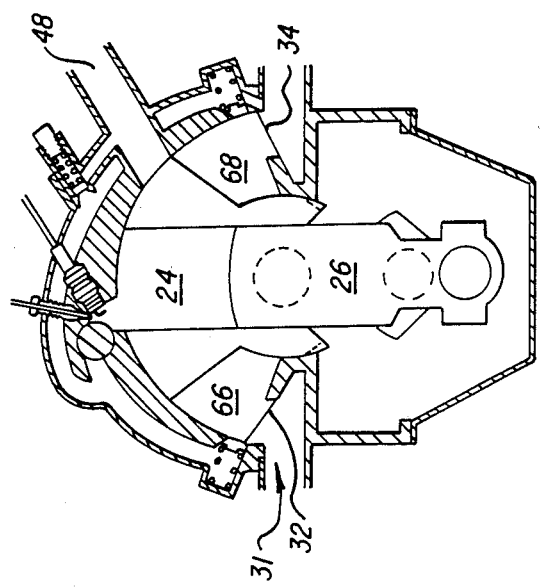

Further movement of the piston 26 to bottom out in the cylinder bore 24 as shown by FIG. 8 will return the piston 26 and the rocking cylinder or pivoting member 20 to vertical alignment on a common axis with the right side of the pivoting member 20 closing the exhaust passage 48. At this stage, the reed valve 32 is partially open, permitting the introduction of air through the inlet port 31 to a primary combustion chamber 66 defined between the surface of the pivoting member 20 and the surfaces 13 and 15 of the cylinder head 14.

Figure 9:
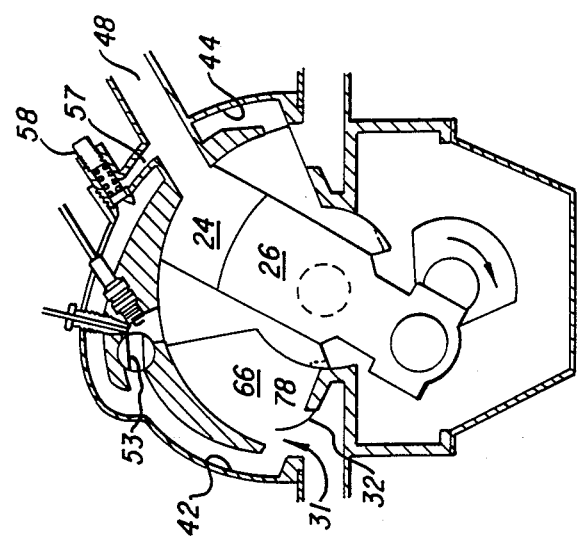

As the crankshaft continues rotation in a clockwise direction, the piston 26 moves upwardly in the cylinder bore 24 moving the pivoting member 20 approximately 30° off the previously mentioned vertical axis to a position where the cylinder bore 24 is in fluid communication with the exhaust passage 48 which has previously been purged with fresh air entering through the inlet port 33 as shown by FIG. 7. As the pivoting member moves to the position depicted in FIG. 9, any air remaining in the secondary compression chamber 68 is compressed and displaced into the fluid passage 44 which is in fluid communication with the precombustion chamber 40 through the port 53 of rotary valve 50. As shown by FIG. 9, the curved cylindrical surface 21 of the pivoting member 20 blocks the precombustion chamber 40 when the rotary valve port 53 opens to provide fluid communication between the fluid passages 42, 44 and the chamber 40.

The reed valve 32 is also fully open permitting additional air to enter the primary combustion chamber 66 and the fluid passage 42 upon pressurized opening of the valve element 36. This occurs as the crankshaft continues it clockwise rotation moving the piston 26 and the pivoting member 20 into alignment along a common vertical axis with the piston 26 at top dead center of the bore 24 in position for another power stroke upon ignition of the compressed air and fuel delivered to the precombustion chamber 40. During this movement from the FIG. 9 to the FIG. 6 position, the pivoting member 20 serves as a piston device compressing the air in the primary compression chamber 66 which opens the spring biased valve element 36 providing fluid communication between the primary compression chamber 66 and the fluid passageway 42.

The grooves 78 and 79 provided in the pivoting member 20 provide fluid communication between the crankcase and the compression chambers 66 and 68 in the positions depicted in FIGS. 9 and 7 respectively.

The internal combustion engine 10 thus through the introduction of a rocking cylinder or pivoting member 20 and the primary and secondary compression chamber 66 and 68 provided between the cylinder head walls 13, 17 and 15 on each side of the pivoting member 20 thus provides a unique means by which the amount and extent of air compression delivered to the precombustion chamber 14 is entirely independent of the volumetric displacement of the piston 26 in the cylinder bore 24.

The internal combustion engine 10 also permits the air compression ratio or at least the maximum air pressure delivered to the precombustion chamber 40 to be controlled through the provision of the pressure regulator 58 which together with the fluid passageway 57 provides communication between the fluid passages 42 and 44 and the exhaust passage 48 to relieve air pressure in excess of a predetermined desired pressure. The pressure regulator 58 may be adjustable or replaced with another pressure regulator preset to a different pressure to accommodate different types of fuel, different air fuel mixtures or a different compression ratio depending upon the application to which the internal combustion engine 10 is intended to be applied.

Figure 10:
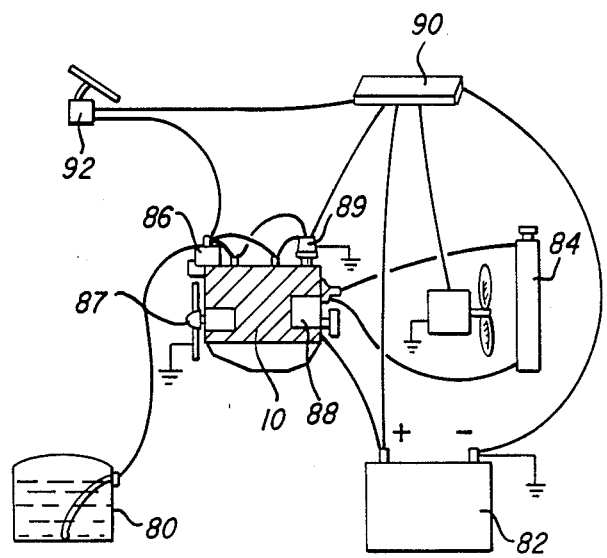
FIG. 10 is a schematic diagram showing the combination of the engine with other related operative devices.

Although the arrangement of the piston 26 reciprocally and slidably mounted in the cylinder bore 24 of the rocking cylinder or pivoting member 20 and the primary and second compression chambers 66 and 68 provided through the interaction of the pivoting member 20 with the cylinder head 14 are unique and offer numerous advantages over conventional engines, the internal combustion engine 10 can be installed and operated with other conventional related operative devices. As shown schematically in FIG. 10, the internal combustion engine 10 may be connected in much the same manner as a conventional engine to a fuel tank 80, a battery 82 providing an elecrical potential and a fan cooled radiator 84. An injection pump 86 and starter 87 can be mounted directly to the engine housing 12 as well as a conventional alternator 88 and distributor 89. Interaction of the various related devices and engine speed may be controlled by a conventional control unit 90 and accelerator device 92.

The internal combustion engine of the present invention offers several advantages over conventional engines. In terms of fuel economy the engine of the present invention provides sufficient air to assure efficient combustion developing more power and also provides for improved scavenging of the unburned gases during the exhaust stroke. The change in concept eliminates the need for a compression stroke of the piston and negative aspects associated therewith.

The internal combustion engine of the present invention also eliminates certain parts such as a push-rod and camshaft utilized in conventional engines which reduce the weight and the cost of manufacturing the engine. Reducing the number of moving parts and suplifying the mechanism provide substantial economy in the manufacturing costs.

The weight to power ratio is substantially improved since the engine of the present invention weighs only about one-half the weight of a conventional four stroke engine of equivalent power rating. This also contributes to fuel savings.

Since the engine of the present invention provides power equivalent to that of a larger conventional engine the reduced space requirements make the engine very attractive for certain applications.

The potential use or choice of different fuels also makes the engine of the present invention very attractive and convenient to consumers.

Although a single embodiment of the invention has been disclosed, the present invention is not to be construed as limited to the particular form disclosed herein since the foregoing description is to be regarded as illustrative rather than restrictive and it should be understood that modifications and variations in the details of the construction disclosed herein may be made without departing from the spirit and scope of the invention as defined by the claims appended hereto.

I claim:

1. An internal combustion engine comprising:
   a member mounted on trunnions for pivoting movement internally of said engine,
   a cylinder formed as a bore extending through said member,
   a piston mounted for reciprocating movement internally of said cylinder,
   a precombustion chamber associated with said cylinder and adapted to receive a mixture of fuel and compressed air, and
   igniter means adapted to fire said mixture in said precombustion chamber, whereby said member provides means external of said cylinder for compressing and transferring air to said precombustion chamber.

2. The internal combustion engine defined by claim 1, wherein said engine further includes an engine housing, a cylinder head having a curved inner surface and a crankshaft mounted to said engine housing, said member is formed at one end with a curved surface complementary to said curved inner surface of said cylinder head, said trunnions are located adjacent the other end of said member, one end of said piston is slidably mounted for reciprocating movement internally of said bore and the other end of said piston is mounted to a crank of said crankshaft whereby movement of said piston in said bore will rotate said crankshaft and pivot said member about said trunnions.

3. The internal combustion engine defined by claim 2, wherein said curved inner surface of said cylinder head is a curved cylindrical surface and said cylinder head is formed with a pair of surfaces with each surface extending inward from one end of said curved cylindrical surface toward said trunnions mounting said member and together with said member and said cylindrically curved surface define a compression chamber on each side of said member.

4. The internal combustion engine defined by claim 3, wherein said cylinder head includes said precombustion chamber adapted to receive a mixture of fuel and compressed air, said precombustion chamber is located proximate a midpoint between the ends of said cylindrical curved surface, first and second fluid passages with each fluid passage open at one end to one of said compression chambers and at the other end to said precombustion chamber, a valve controlling the flow of fluid from said fluid passages to said precombustion chamber, an exhaust passage located intermediate said one end of said second-fluid passage and said precombustion chamber and extending through said cylinder head, an air inlet port in each of said surfaces extending inward from said cylindrical curved surface and a valve associated with each air inlet port whereby movement of said piston in said bore will pivot said member toward said first fluid passage drawing air into said compression chamber associated with the second fluid passage and scavenge unburned gases near the exhaust passage then pivot said member toward said second fluid passage compressing such air as may remain in the compression chamber associated with the second fluid passage while drawing air into the compression chamber associated with the first fluid passage and then pivot said member back toward said first fluid passage thereby compressing air in said compression chamber associated with said first fluid passage until said cylinder bore is aligned for firing the mixture in said precombustion chamber.

5. The internal combustion engine defined by claim 4 further including a fluid conduit connecting said second fluid passage with said exhaust passage and a pressure regulator controlling fluid flow through said fluid conduit whereby excess air pressure may be released through said exhaust passage to maintain a desired compression ratio.

6. The internal combustion engine defined by claim 5, wherein said pressure regulator is adjustable.

7. An internal combustion engine comprising:
   an engine housing,
   a cylinder comprising a bore extending through a member mounted to said engine housing on trunnions internally of said engine for pivoting movement about the axis of said trunnions,
   a piston having a head at one end reciprocally slidably mounted in said bore,
   a crankshaft rotatably mounted to said engine housing, the other end of said piston having means for attaching said piston to a crank of said crank shaft,
   a cylinder head mounted to said engine housing, said cylinder head having a cylindrically curved surface concentric with the axis of said trunnions and including a precombustion chamber intermediate the ends of said cylinrically curved surface, first and second fluid passages with each fluid passage having one end open adjacent one end of said cylindrically curved surface and the other end open to said precombustion chamber and an exhaust passage intermediate said one end of one of said fluid passages and said precombustion chamber,
   a valve controlling flow of fluid from said fluid passages to said precombustion chamber,
   means cooperating with said cylindrically curved surface and said member to define a compression chamber on each side of said member, and
   an air inlet port associated with each said compression chamber,
   whereby reciprocatory movement of said piston internally of said bore will rotate said crank shaft and pivot said member on said trunnions to sequentially, alternately draw air into one of said compression chambers while compressing air present in the other said compression chamber and fluid passageway associated therewith.

8. An internal combustion engine comprising:

an engine housing, a cylinder comprising a bore extending through a member mounted to said engine housing on trunnions internally of said engine for pivoting movement about the axis of said trunnions, said member having a curved cylindrical surface concentric with the axis of said trunnions, a crankshaft rotatably mounted to said engine housing, a piston having a head at one end mounted for reciprocating movement in said bore and means attaching the other end of said piston to a crank of said crankshaft, a cylinder head mounted to said engine housing and having a cylindrically curved interior surface concentric with said cylindrically curved surface of said member, fluid passages for delivering a mixture of fuel and compressed air to said bore, means controlling the flow of said mixture to said bore and an exhaust passage for removing spent gasses from said bore, a fluid conduit connecting said fluid passages with said exhaust passage, and a pressure regulator controlling fluid flow through said fluid conduit whereby excess pressure may be released from said fluid passages to said exhaust passage to maintain a desired compression ratio of the fuel and air mixture delivered to said bore.

9. An internal combustion engine comprising:

a curved cylinder head, a cylinder provided in a member mounted for rocking movement on trunnions internally of said engine, and a piston mounted for reciprocating movement internally of said cylinder whereby fluid is compressed by said rocking movement of said member and transferred to said curved cylinder head where said compressed fluid is mixed with fluid for ignition.

* * * * *